United States Patent [19]

Scully et al.

[11] Patent Number: 5,070,470
[45] Date of Patent: Dec. 3, 1991

[54] METHODS FOR HANDLING CALENDAR INFORMATION IN A DATA PROCESSING SYSTEM

[75] Inventors: Keith J. Scully, Austin, Tex.; Harinder S. Singh, Chapel Hill, N.C.

[73] Assignee: International Business Machines Corporation, Armonk, N.Y.

[21] Appl. No.: 136,168

[22] Filed: Dec. 18, 1987

[51] Int. Cl.⁵ .............................................. G06F 15/40
[52] U.S. Cl. ................................ 364/705.08; 340/706; 364/407
[58] Field of Search ... 364/900 MS File, 200 MS File, 364/145, 569, 400, 401, 407, 705.08, 705.07; 340/717, 700, 706; 368/28

[56] References Cited

U.S. PATENT DOCUMENTS

| | | | |
|---|---|---|---|
| 4,302,752 | 11/1981 | Weitzler | 340/309.1 |
| 4,518,267 | 5/1985 | Hepp | 364/569 |
| 4,626,836 | 12/1986 | Curtis et al. | 340/706 |
| 4,645,238 | 2/1987 | Vincent et al. | 340/700 X |
| 4,807,154 | 2/1989 | Scully et al. | 340/706 X |
| 4,807,155 | 2/1989 | Cree et al. | 340/706 X |
| 4,817,018 | 3/1989 | Cree et al. | 364/521 X |
| 4,819,191 | 4/1989 | Scully et al. | 340/706 X |
| 4,866,611 | 9/1989 | Cree et al. | 340/706 X |

FOREIGN PATENT DOCUMENTS 0142067 5/1985 European Pat. Off. .

OTHER PUBLICATIONS

IBM TDB, "Calendar Security", vol. 26, No. 9, pp. 4733-4734, Feb. 1984.
IBM TDB, "Automated Meeting Data Structure for Information Interchange in an Office Network", vol. 29, No. 8, p. 3422, Jan. 1987.
IBM TDB, "Generalized Request/Reply Mechanism for Use in Asynchronous Distributed Environments", vol. 29, No. 8, pp. 3345-3357, Jan. 1987.

Primary Examiner—Gareth D. Shaw
Assistant Examiner—Paul Kulik
Attorney, Agent, or Firm—H. St. Julian; Casimer K. Salys; Douglas H. Lefeve

[57] ABSTRACT

The present invention relates to methods of automatically generating a data stream in which a calendar owner can request the status of a plurality of calenders maintained by an electronic calendaring system. A first data structure is generated by the system in response to the entry of calendar information by the calendar owner. The first data structure includes a plurality of predetermined fields for storing the calendar information. Each of the plurality of fields are compared to equivalent fields in identified ones of the plurality of calendars. A second data structure is then generated for each of the identified ones of the plurality of calendars which sets forth the status of calendaring an event thereon. The second data structure is transmitted to the calendar owner to confirm the status of each of the identified ones of the plurality of calendars.

9 Claims, 8 Drawing Sheets

TRIGGER (TGR)

| BYTES | NAME | TYPE | MIN | MAX | LGTH | OPT |
|---|---|---|---|---|---|---|
| 0-1 | STRUCTURE LENGTH | NUM | | 32767 | 2 | R |
| 2 | STRUCTURE TYPE1 | COD | X'D3' | X'D3' | 1 | R |
| 3 | STRUCTURE TYPE2 | COD | X'8F' | X'8F' | 1 | R |
| 4-3+n | TGR TRIPLETS | | * | * | n | O |

FIG. 3

TRIGGER TYPE (TTP)

| BYTES | NAME | TYPE | MIN | MAX | LGTH | OPT |
|---|---|---|---|---|---|---|
| 0 | TRIPLET LENGTH | NUM | 3 | 3 | 1 | R |
| 1 | KEYWORD | COD | X'7F' | X'7F' | 1 | R |
| 3 | TYPE | BST | | | 1 | R |

FIG. 4

MAIN MENU SCREEN

SELECT THE ITEM NUMBER THEN HIT ENTER.

```
                                  AUGUST          1986
  1  CALENDAR ENTRY                            1  2
     MEETING, APPOINTMENT,        3  4  5  6  7  8  9
     TRIGGER, NOTE, VACATION,    10 11 12 13 14 15 16
     HOLIDAY, OFFSITE,           17 18 19 20 21 22 23
     NOT NORMAL WORK HOURS       24 25 26 27 28 29 30
  2  VIEW SELECT                 31
  3  VIEW COMPOSITE CALENDAR
  4  CONFERENCE ROOM              SEPTEMBER       1986
  5  AUTOMATIC RESPONSE              1  2  3  4  5  6
  6  NAMES LIST SETUP             7  8  9 10 11 12 13
  7  RECONCILE CALENDARS         14 15 16 17 18 19 20
  8  AUTO INVOCATION             21 22 23 24 25 26 27
                                 28 29 30
```

COMMAND: _____

PF1=HELP    PF3=RETURN TO SYSTEM

FIG. 5A

CALENDAR ENTRY SCREEN WITH AUTOMATIC MEETING OR APPOINTMENT

CALENDAR ENTRY:
CLASSIFICATION: 1 (SELECT ONE CLASSIFICATION NUMBER FROM THE CLASSIFICATION LIST)
  CLASSIFICATION LIST: 1 MEETING  2 APPOINTMENT  3 OFFSITE  4 VACATION  5 HOLIDAY
                       6 NOTE  7 NOT NORMAL WORK HOURS
USER DEFINED FIELD: _____ (8 CHARACTERS)
PRIORITY (1 TO 10): 02 (1=HIGHEST, 10=LOWEST)
EVENT IDENTIFIER: D35 MEETING A1
MEETING/APPOINTMENT OPERAND: ___ (SCHEDULE, RESCHEDULE, POSTPONE, CANCEL)
STATUS REQUEST OPERAND: ___ (MEETING, INVITEE)
MEETING/APPOINTMENT/NOTE INFORMATION:
    NAMES LIST, CALLER, SUBJECT AND PLACE FIELDS ARE IGNORED IF THE
    CLASSIFICATION IS NOT MEETING OR APPOINTMENT
  DATE: 10/07/86        START TIME: 1:15 PM   END TIME: 5:00 PM
  DATE: 10/08/86 R2     START TIME: 8:30 AM   END TIME: 5:00 PM
    RX AFTER DATE WILL REPEAT THE EVENT AT THE SAME TIME, X NUMBER OF DAYS
  NAMES LIST    : D35 NAMES A1
  CALLER        : TOM ROBERTS
  SUBJECT       : 1987 BUDGET
  PLACE         : CONFERENCE ROOM 128F
  DETAILS/NOTE  :
AUTO SCHEDULE: : __ (Y/N)  EVENT DURATION: ___ (MINUTES 1-480)  DAYS: ___ (1-99)
    IF AUTO SCHEDULE IS SELECTED, THE MEETING WILL BE SCHEDULED INTO A TIMESLOT THAT DOES
    NOT HAVE ANY OF THE RESTRICTING CRITERIA SELECTED BELOW. IF NOTHING IS SELECTED AS
    CRITERIA, THE MEETING WILL BE SCHEDULED INTO AN OPEN TIMESLOT ONLY.
AUTO SCHEDULE SEARCH CRITERIA: 2+C+A  1+C+A  B3  D+SEPTEMBE
    SEARCH CRITERIA LIST: ANY ENTRY CLASSIFICATION, BX PRIORITY X (X=1 TO 10),
                         D USER DEFINED FIELD (D+8 CHARACTERS)
    ENTER THE CLASSIFICATION AND/OR SEARCH CRITERIA ITEM SEPARATED BY A SPACE.
    SELECT FROM THE CLASSIFICATION AND SEARCH CRITERIA LISTS. ENTER USING THE FORMAT:
    CLASSIFICATION+(C-CONFIRMED OR T-TENTATIVE)+(A-ATTENDING OR M-MAY ATTEND)

PF1=HELP  PF3=CANCEL  PF5=SEND NOTICE  PF6=BEGIN SEARCH  PF7=CONFERENCE ROOM
PF8=NEXT SCREEN (SECURITY, STATUS, TRIGGER)  PF9=FILE  PF11=ADD ONE LINE

IMPLIED PRIORITY ASSIGNMENTS LIST IN THE FORMAT-PRIORITY-ENTRY/STATUS
    PRIORITY IS FOR PURPOSES OF FINDING A USED TIMESLOT WITH A SCHEDULED ITEM WITH A
    LESSER PRIORITY THAN THE ITEM BEING SCHEDULED INTO THAT SAME TIMESLOT.
    1-MEETING/CONFIRMED & ATTENDING
    2-APPOINTMENT/CONFIRMED & ATTENDING
    3-VACATION, HOLIDAY OR OFFSITE/CONFIRMED
    4-MEETING/TENTATIVE & ATTENDING
    5-APPOINTMENT/TENTATIVE & ATTENDING
    6-MEETING/CONFIRMED & MAY ATTEND
    7-APPOINTMENT/CONFIRMED & MAY ATTEND
    8-VACATION, HOLIDAY OR OFFSITE/TENTATIVE

FIG. 5B

CALENDAR ENTRY SCREEN TWO

SECURITY:__ (P=PUBLIC, S=SHARED, R=PRIVATE) (PICK ONE)

STATUS:__ (T=TENTATIVE, C=CONFIRMED) (PICK ONE)

TRIGGER: M, P, A (M=MESSAGE, P=PROCESS, A=AUDIO TONE) (ALL THREE MAY BE SELECTED)

DATE: 10/07/86    TIME: 1:00 PM  (PF11 WILL ADD ADDITIONAL DATE LINES)
    DATE: 10/08/86 R2  TIME: 8:00 AM
    (RX AFTER DATE WILL REPEAT THE EVENT AT THE SAME TIME, X NUMBER OF DAYS)
    NAMES LIST: D35/AUSVM1 ENTER THE NOTIFICATION LIST VNET ADDRESS.
    MESSAGE    : THE DEPARTMENT MEETING STARTS IN 15 MINUTES
        (PF11 WILL ADD ONE LINE)
    PROCESS    : INVEST01/AUSVM1 ENTER THE PROCESS VNET ADDRESS
        PICK UP THESE CALCULATIONS BEFORE THE BUDGET MEETING.

TRIGGER FIXED OR FLOAT:__ (F=FIXED, L=FLOAT) (PICK ONE)

FLOAT WITH EVENT IDENTIFIER: D35 MEETING A1
    (IF THIS EVENT MOVES, THE TRIGGER WILL BE MOVED TO THE SAME RELATIVE TIME)

PF1=HELP  PF3=CANCEL   PF5=SEND NOTICE   PF6=BEGIN SEARCH
PF7=PREVIOUS SCREEN   PF8=NEXT SCREEN  PF9=FILE   PF11=ADD ONE LINE

FIG. 5C

AUTO INVOCATION
PROCESSES THAT HANDLE EACH REQUEST ARE STARTED WITH TRIGGERS. THESE TRIGGERS CONTAIN THE PROCESS NAMES AND ARE GENERATED AUTOMATICALLY WHEN THIS FRAME IS INVOKED WITH PF9.

1. AUTOMATIC MEETING SCHEDULING: (THE MEETING WAS SETUP USING CALENDAR ENTRY)
NAME: D35 MEETING A1   OWNERS ADDRESS: SCULLY/AUSVM1
BEGIN DATE: 6/29/87   INTERVAL: 45 (DAYS)
CANCELLATION INFORMATION (REQUIRED ATTENDEES AND DAYS PRIOR TO MEETING):
REQUIRED ATTENDEE: JIM PENROD   CANCEL 04 DAYS PRIOR TO MEETING
  (CANCELLATION WILL OCCUR IF REQUIRED ATTENDEE(S) AREN'T ATTENDING)

2. MEETING STATUS SELECTED BY NAME:
NAME: D35 MEETING A1   ADDRESS: SCULLY/AUSVM1
BEGIN DATE: 6/29/87 "OR" BEGIN DAYS PRIOR: ___ INTERVAL: 03 (DAYS)
CANCELLATION INFORMATION (REQUIRED ATTENDEES AND DAYS PRIOR TO MEETING):
REQUIRED ATTENDEE: JIM PENROD CANCEL 04 DAYS PRIOR TO MEETING
  (CANCELLATION WILL OCCUR IF REQUIRED ATTENDEE(S) AREN'T ATTENDING)

3. MEETING STATUS REQUESTS IN A SELECTED TIMESPAN
ADDRESS: PHILLIP/RCHVM5   BEGIN DATE: 07/15/87   END DATE: 08/15/87   INTERVAL: 3 (DAYS)
ADDRESS: MCINTRY/NYVM7   BEGIN DATE: 07/15/87   END DATE: 08/15/87   INTERVAL: 3 (DAYS)

4. MEETING ATTENDEE STATUS:
NAME: D55 MEETING A1   ADDRESS: EDEL/AUSVM6
BEGIN DATE: _____ "OR"   BEGIN DAYS PRIOR: 005   INTERVAL: 04 (DAYS)

NAME: D75 MEETING A1   ADDRESS: STARK/DALHQIC1
BEGIN DATE: _____ "OR"   BEGIN DAYS PRIOR: 014 INTERVAL: 03 (DAYS)

5. CALENDAR VIEW REQUESTS:
ADDRESS: SCULLY/AUSVM1   BEGIN DATE: 07/15/87   INTERVAL: 15 (DAYS)
ADDRESS: EDEL/AUSVM6   BEGIN DATE: 07/15/87   INTERVAL: 15 (DAYS)

6. CALENDAR DATE AND TIME REQUESTS: (PICK CRITERIA FROM LISTS BELOW)
SET 1
ADDRESS: SCULLY/AUSVM1   BEGIN DATE: 07/15/87 INTERVAL: 15 (DAYS)
  DATE AND TIME MAP CRITERIA: 2+C+A  1+C+A  B3  D+SEPTEMBE
SET 2
ADDRESS: EDEL/AUSVM6   BEGIN DATE: 07/15/87 INTERVAL: 15 (DAYS)
  DATE AND TIME MAP CRITERIA: 8

ADDRESS: STARK/AUSVM1   BEGIN DATE: 07/15/87 INTERVAL: 15 (DAYS)
  DATE AND TIME MAP CRITERIA: 8

CLASSIFICATION LIST: 1 MEETING   2 APPOINTMENT   3 OFFSITE   4 VACATION   5 HOLIDAY
         6 NOTE   7 NOT NORMAL WORK HOURS   8 OPEN TIME
SEARCH CRITERIA LIST: ANY ENTRY CLASSIFICATION, BX PRIORITY X (X=1 TO 10),
         D USER DEFINED FIELD (D+8 CHARACTERS)
ENTER THE CLASSIFICATION AND/OR SEARCH CRITERIA ITEM SEPARATED BY A SPACE. SELECT FROM THE CLASSIFICATION AND SEARCH CRITERIA LISTS. ENTER USING THE FORMAT:
     CLASSIFICATION+(C-CONFIRMED OR T-TENTATIVE)+(A-ATTENDING OR M-MAY ATTEND)
PF1=HELP   PF3=CANCEL   PF5=REPEAT FIND   PF7=SCROLL BACKWARD   PF8=SCROLL FORWARD
PF9=FILE & BEGIN PROCESS   PF11=ADD ONE ENTRY TEMPLATE   PF12=ADD DATE/TIME MAP SET

FIG. 6

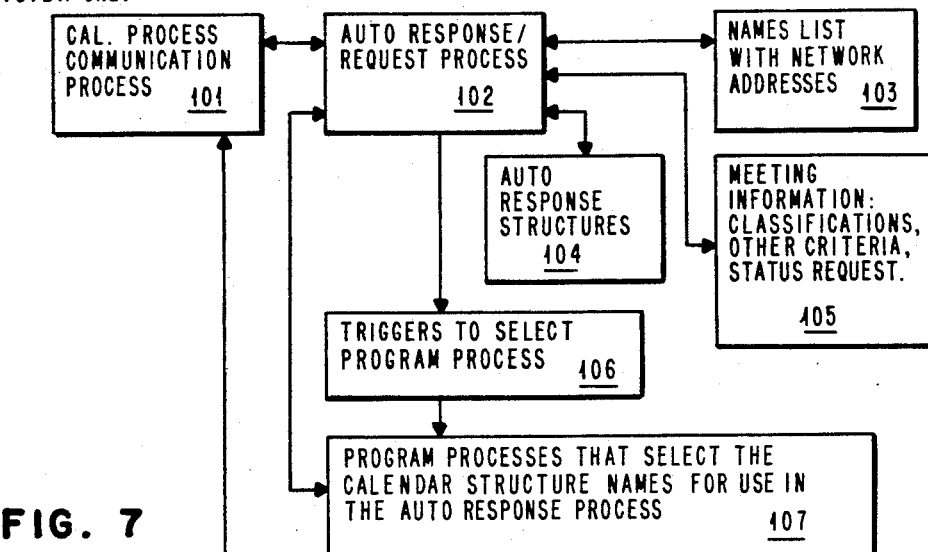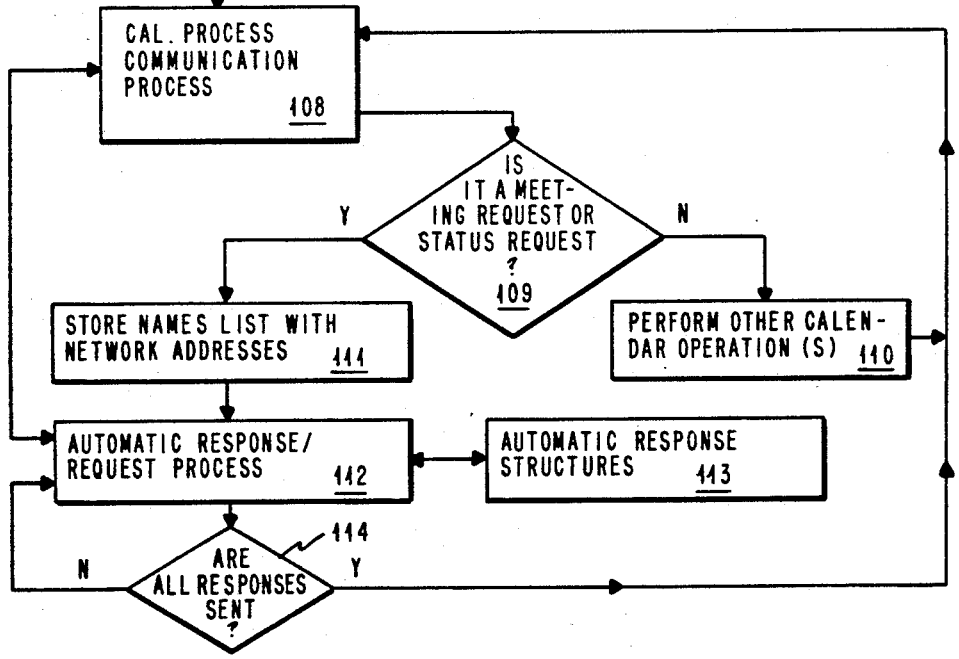
FIG. 7

METHODS FOR HANDLING CALENDAR INFORMATION IN A DATA PROCESSING SYSTEM

CROSS REFERENCE TO RELATED APPLICATIONS

This application is related in subject matter to the following applications filed concurrently herewith and assigned to a common assignee:

Application Ser. No. 07/136,254 (IBM Docket filed by K. J. Scully et al. entitled "Method of Exchanging Entries from a Plurality of Different Electronic Calendars Based on Interactively Entered Criteria".

FIELD OF INVENTION

This invention relates in general to electronic calendaring methods, and in particular, to a methods of automatically building a data stream based on criteria that is entered interactively by a calendar owner.

BACKGROUND ART

The prior art has disclosed a number and variety of interactive electronic calendaring systems and methods. The objective of all of these systems is primarily to assist the person who, for a number of different reasons, maintains a calendar of future events containing various information about the event at entry points on the calendar which relate to the time of the event.

The increase of personal computers and intelligent workstations in recent years has made it possible for calendar owners to establish and maintain their calendars on these interactive type data processing systems. Hence, the term "electronic calendaring."

Two general types of interactive electronic calendaring systems have thus evolved in the art. In one type of calendaring system, the owner of the calendar is generally also the user of the workstation and that workstation is generally not a part of a larger network. Generally, in these types of systems, the calendar functions involve presenting a screen to the user representing a day calendar divided into a number of time periods or time slots. Each period is capable of displaying a limited amount of text that the user enters. In some systems, the day calendar can scroll vertically to present more time periods to the user or horizontally to present longer text entries. The operator can generally "page" forward or backward and, in most arrangements, can display a requested date. These calendaring methods generally do not limit the type of event that is calendared nor the terminology employed at any of the entry points and, to that extent, function in the same manner as conventional manual calendars or appointment books. The electronic calendaring method and systems do have an advantage over the prior art manual calendaring of events in that the user generally has the ability to scan a time span involving a large number of days and identify calendared events quite rapidly.

The other type of calendaring arrangement that has developed in the prior art involves multi-user environments having a large number of terminals or workstations which are generally part of a larger communication network. Usually these networks have been established to permit the users to interact with each other and with data maintained on the system. In this environment, a user at a terminal or workstation can send a message to one or more of the other users on the network concurrently, and is notified when the addressees have received and read the message. In most of these environments, each user generally maintains a calendar, and in many of these environments the reason for having a network in which users interact, quite often involves user interaction that requires reference to the respective electronic calendars of the users. A considerable amount of time is therefore spent by calendar users in many organizations, with people checking and rearranging their calendars to accommodate various events such as meetings and presentations. Calendar systems have progressed to the point where a person who is calling a meeting can at least view the calendars of a number of users that he intends to invite to a meeting, in order to determine a common available time for the meeting.

In this prior art system, a screen is presented to the meeting originator which requests the data necessary for the system to determine times that all potential attendees would be available. The data requested includes, for example, the length of the meeting, a time period during which the meeting should be conducted, the place of the meeting and the names of the attendees. Based on this data, the method returns a screen of available times after inspecting each attendee's day calendar during the time period for free time slots or periods.

The originator then selects the beginning time and end time of the meeting, including the time and date, and invitations are automatically sent to all the attendees, requesting their attendance at the scheduled meeting.

While such an automatic system saves time in finding a convenient meeting time, relative to the manual process, the process is limited to the scheduling of meetings based on "free time" as represented by the absence of a calendar entry on each of the inspected calendars. This approach does not recognize that some calendar entries are less important than others and, in practice, it is often impossible to find a common period of "free time" for a meeting that involves a large group of people or a meeting involving a number of people whose work requires a large number of meetings.

The prior art systems are limited to examining calendars of others in connection with setting up a meeting. It was soon recognized that there were other situations besides calling a meeting where it would be beneficial to be able to create a "selected view" of a number of individual calendars.

A department manager, for example, may have an assignment that can be given to a number of different people in his department. If the calendaring system could display to the manager the calendared events of each of these people which meet a set of search criteria entered into this system interactively by the manager, considerable time and effort could be saved by everyone involved. While time available or free time may be one of the search criteria entered, other criteria such as the relative importance of the events that are calendared to the new assignment, might also provide the manager with more relevant data than just free time. Also, identifying the person who handled the same or similar assignment in the past, similar assignments scheduled in the future or other assignments scheduled at the same geographic location or customer could be important criteria for the manager to employ. These deficiencies of the prior art electronic calendaring methods, namely using only free time to find relevant calendar entries, are overcome by the present invention.

SUMMARY OF THE INVENTION

The present invention relates to methods of automatically generating a data stream in which a calendar owner can request the status of a plurality of calendars maintained by an electronic calendaring system. A first data structure is generated by the system in response to the entry of calendar information by the calendar owner. The first data structure includes a plurality of predetermined fields for storing the calendar information. Each of the plurality of fields are compared to equivalent fields in identified ones of the plurality of calendars. A second data structure is then generated for each of the identified ones of the plurality of calendars which sets forth the status of calendaring an event thereon. The second data structure is transmitted to the calendar owner to confirm the status of each of the identified ones of the plurality of calendars.

DESCRIPTION OF THE DRAWINGS

FIG. 3 illustrates a structure of a calendar object which is employed by the present invention.

FIG. 4 illustrates a structure of a calendar triplet which is employed by the calendar object of FIG. 3.

FIGS. 5a through 5c are screens presented to a calendar owner to assist in defining criteria to be used by the system in selecting calendar entries during a calendar entry function.

FIG. 6 is a screen presented to the calendar owner to assist in the automatic invocation of a plurality of calendar functions in accordance with the principles of the invention.

FIGS. 7 and 8/illustrate a flow chart illustrating the detailed steps of the method of the present invention.

BRIEF DESCRIPTION OF THE PREFERRED EMBODIMENT

Figure 1:
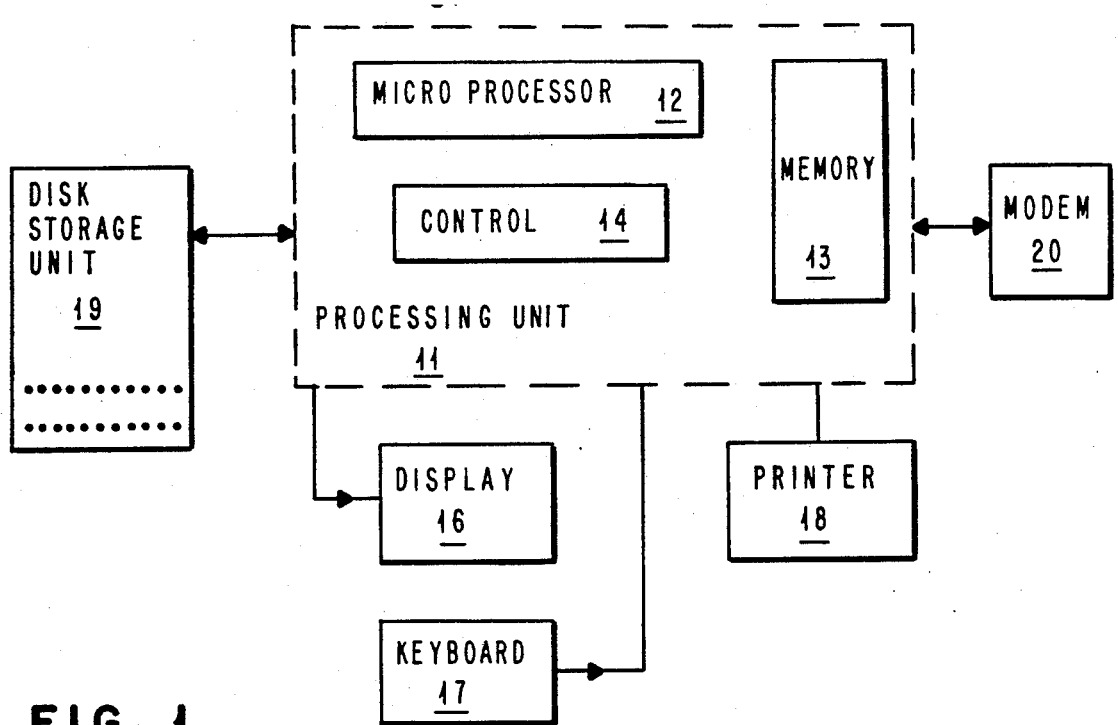
FIG. 1 illustrates an interactive workstation in which the method of the present invention may be advantageously employed.

FIG. 1 illustrates the functional components of an interactive type data processing terminal on which the electronic calendaring method of the present invention may be advantageously employed. The terminal comprises a processing unit 11 which includes a microprocessor block 12, a semiconductor memory 13, and a control block 14 which functions to control input/output operations in addition to the interaction between the micro-processor block 12 and the memory unit 13.

The terminal further includes a group of conventional peripheral units including a display device 16, a keyboard 17, a printer 18, a disk storage unit 19, and a modem 20. Since the details of the above-described functional blocks form no part of the present invention and can be found in the prior art, only a brief functional description of each block is set forth, along with a description of their interactions, sufficient to provide a person of ordinary skill in the art with a basis of understanding applicants improved electronic calendaring method.

Processing unit 11 corresponds to the "system unit" of a personal computer system such as the IBM XT or IBM AT type systems. Unit 11 is provided with an operating system program which may be one of the many versions of DOS (Disk Operating System) which is normally employed to run the systems. The operating system program is stored in memory 13 along with one or more application programs that the user has selected to run. Depending on the capacity of memory 13 and the size of the application programs, portions of these programs, as needed, may be transferred to memory 13 from the disk storage unit 19 which may include, for example, a 30 megabyte hard disk drive and a diskette drive. The basic function of the disk storage unit is to store programs and data that are employed by the system and which may readily be transferred to the memory unit 13 when needed. The function of the diskette drive is to provide a removable storage function for entering programs and data into the system, and a vehicle for storing data in a form that is readily transportable for use on other terminals or systems.

Display device 16 and keyboard 17 together provide for the interactive nature of the terminal, in that in normal operation, the interpretation that the system gives to a specific keystroke by the operator depends, in substantially all situations, on what is being displayed to the operator at that point in time.

In some situations, the operator, by entering commands into the system, causes the system to perform a certain function. In other situations, the system requests the entry of certain data, generally by displaying a prompt type of menu/message screen. The depth of the interaction between the operator and the system varies by the type of operating system and the application program, but is a necessary characteristic of terminals on which the method of the present invention may be employed.

The terminal shown in FIG. 1 further includes a printer 18, which functions to provide hard copy output of data developed or stored in the terminal. Lastly, the modem 20 functions to transfer data from the terminal of FIG. 1 to a host system through one or more communication links which may be a commercial type link or a dedicated communication link.

Figure 2:
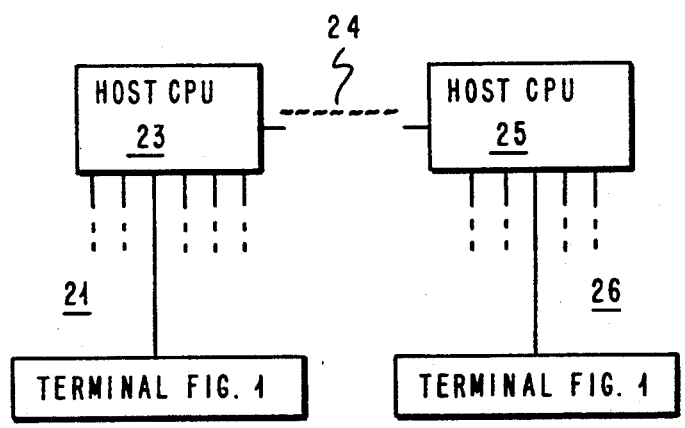
FIG. 2 illustrates a network of interactive workstations of the type shown in FIG. 1.

FIG. 2 illustrates a first information processing system which includes a network 21 of interactive type workstations of the type shown in FIG. 1. As illustrated, the network 21 includes a plurality of terminals which are interconnected with each other and to a host central processing unit 23. The information processing system is connected via communication link 24 to a second information processing system which includes a host processing unit 25 and a network 26 of interactive workstations. Functionally, each of the systems operates to allow one terminal to communicate to one or more other terminals using established communication protocols, so that the various serially connected communication links are transparent to the operator. Such systems are well known in the art, and are currently in extensive commercial use. Since these communication links per se are not part of the present invention, only those details that are necessary for an understanding of the calendaring method of the present invention will be described. It should therefore be assumed in the following description, that each workstation on the network has a system node address and a "post office" address, and that to simplify the description, there is only one individual assigned to each node on the network. It should further be assumed that conventional communication services are provided by the system, such as directory listings of individual calendar owners and shareable resources such as meeting rooms, etc., which require scheduling.

The system shown in FIG. 2 processes information as various types of data objects such as text data objects, graphic data objects, and calendar data objects. Each of these data objects are represented by a data stream which comprises a series of structured fields.

FIG. 3 shows a Trigger (TGR) calendar structure which is required by the present invention to generate a data stream. The TGR structure supports the interchange of a trigger entry. The trigger entry provides a way to notify either the calendar owner or specified list or lists of calendar users. Notification may occur in the form of an audio alarm and/or a character message. The TGR structure also specifies a time that a notification will occur and/or a process will begin. The TGR structure includes the following triplets:

STRUCTURE ID: The structure ID is a 1 to 44 byte identifier that identifies the Trigger. Optional structure IDs may be included to select a names list associated with a meeting or to select a names list directly or to perform both of these functions. Calendar owners appearing on the selected list or lists are notified upon the occurrence of the trigger time. If a list is not identified, then only the calendar owner generating the data stream is identified. One optional process structure ID is allowed in a TGR structure to select a process to be started at the trigger time.

TRIGGER TYPE: The trigger type triplet is used to activate the correct support program when a TGR structure is processed.

DATE AND TIME: The date and time triplet provides the time that the trigger process begins. More than one date and time triplet is allowed in the TGR structure.

FIG. 4 shows the structure of the Trigger Type (TTP) triplet. The TTP triplet provides a trigger type for use in the TGR structure. The trigger may be used to activate the correct support program when a TGR structure is processed.

TTP Parameters

TYPE: Specifies whether the trigger is a message, audio tone, process or a combination trigger. Any combination of the following triggers is allowed.

BIT

0 - Message Trigger (Default)—A message will be circulated to a selected list at a selected time.

1 - Audio Trigger—An audio tone will be circulated to a selected list at a selected time.

2 - Process Trigger—The process identified by a process ID will be started at a selected time.

The structure ID triplet, the date and time triplet and other calendar structures and calendar triplets which are relevant to the present invention 30 are disclosed in a copending application, Ser. No. 008,034, filed Jan. 29, 1987, in the name of K. J. Scully et al. and assigned to the assignee of this application and which is incorporated herein by reference thereto.

The Process of Automatically Building a Data Stream

The present invention includes generating a data stream which facilitates the automatic scheduling a of meeting, requesting the status of a scheduled meeting, canceling a meeting, requesting the status of invitees to a scheduled meeting, requesting a view of one or more calendars resident on the information processing systems, and requesting date and time map representations of a plurality of calendars in order to determine unused time slots.

Shown in FIG. 5a is a main menu screen which is displayed to an operator/calendar owner in response to the owner indicating to the system that a calendar function is to be performed. Upon the display of the main menu screen, the operator selects one of the plurality of functions displayed on the screen. In accordance with the present invention, the operator selects the function which pertains to building a, data stream. Therefore, the operator first selects a Calendar Entry function either by entering the numeral associated with the function Calendar Entry and pressing an enter key (not shown) on the keyboard 17 or by positioning a cursor adjacent to the function Calendar Entry on the display 16 and pressing the enter key.

In response to the selection of the Calendar Entry function, the system to which the operator is assigned, displays a first of two calendar entry screens, the first of which is shown in FIG. 5b. The operator then enters a classification for the calendar function to be performed or calendar event to be impacted by the data stream. The operator may enter a user defined field which enables the system to search a plurality of calendars stored on the system to which the operator's terminal is connected or to a system connected to the system by the suitable communications link 24. A priority level is entered which indicates the importance of the calendar event associated with the data stream in relationship to existing entries currently scheduled on a plurality of calendars to be searched. In essence, if the data stream is generated to schedule a meeting on a plurality of calendars, then only currently existing entries on the plurality of calendars having a priority equal to or greater than that associated with the data stream will remain unchanged or will not be preempted by the data stream. An event identifier must be entered indicating a calendar event which the data stream will affect. The operator must then enter whether the data stream is to schedule, reschedule, postpone or cancel the calendar event set forth in the classification list. A status request operand is entered to indicate either the data stream involves a function relating to a meeting or an invitee to the meeting. The calendar screen shown in FIG. 5b enables the operator to either send a meeting schedule request to a plurality of owners of associated calendars stored on the information processing systems seeking feedback in regards to the scheduling of the meeting or to automatically schedule the meeting on the associated calendars.

If the operator desires only to send a request to the plurality of owners, a time span, a distribution list or a list of names of calendar owners to be invited to the meeting, the name of the person calling the meeting, the subject and the place of the meeting is entered. The operator may also include any additional details which the operator desires to transmit to any named recipients along with the meeting scheduling request. The operator may also include an indication in the time span whether the time information associated with a given day in the time span will be repeated. As indicated on the first calendar entry screen, the meeting is to be scheduled for two and one-half days although there are only two lines for time and date information. The second line includes a "RX" function where "X" represents the number of days the same time is to be repeated. Thus, as noted in the FIG. 5b, "R2" causes the system to schedule a first meeting day starting at 1:15 PM and ending at 5:00 PM and a second and a third day starting at 8:30 AM and ending at 5:00 PM. After the operator has entered all of the above-identified information, if the operator has selected the send a request option, the operator then presses a key associated with a "next screen" function indicated near the bottom of the first screen to enable the system to display a second calendar entry screen shown in FIG. 5c.

Shown in FIG. 5c is the second calendar entry screen which enables the operator to enter the operator's security level for the calendar function to be performed, a status indicator and to identify the type of trigger to be used in the calendar function to be performed. The security level indicates whether the operator has been cleared to access or view each of the calendars associated with the name list. The status indicator relates to whether the meeting as set forth in the calendar request is to be held as scheduled or the time is tentative. The trigger indicates the type of notice which will go to each of the named invitees prior to the scheduled meeting. As indicated on the screen, the trigger is a reminder which is sent to each of the named invitees and may be a message, a audio tone and/or the initiating of a process to be performed in preparation for the meeting. Additionally, the operator must enter the time span within which trigger function must occur. For purposes of illustration, the message to be displayed to each of the named invitees and/or the audio tone to be sent to each of the named invitees and/or the initiation of the process if the selected trigger is a message and the process will occur at the time indicated in the time span which is immediately prior to the scheduled meeting. The process to be performed may be a computer process which prints the latest budget calculations for the scheduled meeting. The message may also indicate that each of the named invitees must pick up the latest printout prior to attending the meeting. The operator also enters whether the trigger will be a fixed trigger or a floating trigger. This entry enables to the trigger to move to the same time span if the calendar event associated with the trigger is rescheduled or moved to a different time span. Thereafter, the operator initiates the execution of the request function by pressing a key associated with "send notice" function indicated at the bottom of the second calendar entry screen. The system then re-displays the main menu screen shown in FIG. 5a.

If the operator desires to automatically schedule the meeting on the associated calendars, the operator leaves the time span section of the screen blank. However, the operator must indicate the names list, the identification of the person calling the meeting, the subject of the meeting and the place of the meeting. As stated above, the operator may include the transmission of any additional details which the operator desires to transmit to the calendar owners indicated in the names list when the meeting is scheduled. Then the operator indicates whether an automatic scheduling of the calendar event is to occur and the duration of the event. Additionally, the operator must enter a search criteria which enables the system to preempt certain events which are scheduled on the respective calendars associated with the names list or the distribution list. Thus, if auto schedule is selected by the operator, the meeting will be scheduled into a time slot which does not include any of the criteria entered by the operator. As indicated in the first calendar entry screen, the operator is restricting the scheduling of the meeting in any time slot wherein any of the following event are scheduled: any confirmed appointment which the calendar owner will attend, any confirmed meeting which the calendar owner will attend, any event having a priority equal to or greater than a priority of "3", or a user defined field "SEPTEMBE". After the operator has entered all of the above-identified information, if the operator has selected the auto schedule function, the operator then presses a key associated the "begin search" function to enable the system to automatically schedule the meeting on the associated calendars.

Referring again to FIG. 5a, after receiving responses from the named invitees in response to the notice, the operator may want either to schedule the meeting, to automatically schedule the meeting or to set up an automatic scheduling of the meeting at a regular interval. The operator then selects an Auto Invocation function displayed on the main menu screen. The system, in response to the selection of the Auto Invocation function, displays an auto invocation screen shown in FIG. 6

The auto invocation screen enables the operator to automatically schedule a meeting, determine the status of a specified invitee to a selected meeting, determine the meetings which will be attended by a designated invitee during a time span, request a view of a specified calendar, and request date and time bit maps or composite calendar from a plurality of specified calendars.

Upon the display of the auto invocation screen, the operator enters the name of the meeting to be scheduled, the name of the individual calling the meeting and the associated calendar address, the begin date and an indication of whether the meeting is to be scheduled at set intervals such as every 30 or 45 days. The operator may also enter data relating to the cancellation of the meeting. The name of an invitee which is required to attend the meeting and a period at which the meeting will be automatically canceled if the required invitee will not attend must be entered. After the operator has entered this information for the meeting to be scheduled, the operator presses a key associated with "file and begin process" function indicated at the bottom of the auto invocation screen. As noted above, the scheduled meeting may be automatically canceled if the required invitee will not be attending the meeting. More than one required invitee may be entered and the system will request the attendance status of the required invitees at the specified interval. If the specified invitees will not attend, the system will cancel the meeting.

Information which is provided for the automatic scheduling function, is required for requesting the meeting status for a specified invitee's attendance to a selected meeting. The operator may enter data which enables the system to execute the request beginning at a specified date and repeating the request at a specified interval or to execute the request at a specified number of days prior to the scheduled meeting.

Similar intervals may be entered in regards to requesting meeting attendee or invitee status, calendar view request, calendar date and time request.

In requesting the date and time request, the operator may enter various combinations of view criteria. The view criteria, which is similar to the search criteria disclosed above, enables the system to search for free time on the calendars identified and generate composite for each of the sets of calendars identified in the calendar date and time request section of the auto invocation screen.

After the operator has entered all of the above-identified information for the function to be automatically invoked, the operator then presses a key associated with a "file and begin process" function indicated near the bottom of the auto invocation screen. The system will re-display the main menu screen shown in FIG. 5a while it executes the selected auto function.

Set out below is an illustration of a program for generating the autobuild data stream. The program is in program design language from which source code and machine code are derivable.

```
AUTOBUILD DATA STREAM PROC
    DO SELECT AUTO RESPONSE IN MASTER MENU
    IF A MEETING HAS BEEN SCHEDULED USING THE
            CALENDAR ENTRY PROCESS
        THEN IF A MEETING SHOULD BE SCHEDULED AT
                REGULAR INTERVALS THEN ENTER DATA FOR
                AUTOMATICALLY SCHEDULING THE NAMED
                MEETING
            ENDIF
    ENDIF
    IF MEETING STATUS, MEETING STATUS IN SELECTED
            TIMESPANS, MEETING ATTENDEE STATUS, CALENDAR
            VIEWS AND/OR CALENDAR DATE AND TIME MAPS ARE
            REQUIRED
        THEN ENTER DATA FOR AUTOMATICALLY
                REQUESTING THE REQUIRED
                INFORMATION
    ENDIF
    IF ALL REQUIRED INFORMATION IS ENTERED THEN START
            REQUESTING PROCESS
    ENDIF
END AUTOBUILD DATA STREAM PROC
BEGIN AUTO RESPONSE PROCESS
    IF A CALENDAR STRUCTURE INVOKES THE AUTO RESPONSE
        THEN PASS CONTROL TO THE AUTO RESPONSE
                PROCESS WITH THE ASSOCIATED CALENDAR
                STRUCTURE TO IDENTIFY WHAT THE PROCESS
                SHOULD DO
    ENDIF
    IF EITHER MEETING STATUS, INVITEE STATUS, VIEW,
            DATE AND TIME MAP OR A MEETING CANCEL
            REQUEST IS REQUIRED
        THEN BUILD THE CORRECT CALENDAR
                STRUCTURE FOR TRANSMISSION AND SEND THE
                STRUCTURE TO THE DISTRIBUTION LIST
    ENDIF
    IF A MEETING SCHEDULE REQUEST IS REQUIRED
        THEN SEND A DATE AND TIME MAP TO
                DISTRIBUTION TO SELECT A FREE TIME AND
                THEN BUILD A MEETING STRUCTURE AND
                TRANSMIT THE STRUCTURE TO THE MEETING
                INVITEES (DISTRIBUTION)
    ENDIF
    IF THE REQUEST IS FOR A RESPONSE TO A MEETING
            INVITATION, A RESPONSE TO MEETING INVITEE
            STATUS, A REQUEST FOR A CALENDAR VIEW OR A
            REQUEST FOR A DATE AND TIME MAP AND THE
            REQUESTOR DOESN'T HAVE THE CORRECT SECURITY
        THEN PUT A NOTICE IN THE MAIL THAT A
                MANUAL RESPONSE IS REQUIRED
            ELSE IF THE REQUEST IS FOR A
                    REQUEST FOR A CALENDAR VIEW
                    OR A REQUEST FOR A DATE AND
                    TIME MAP AND THE REQUESTOR
                    DOES HAVE THE CORRECT
                    SECURITY THEN BUILD AND SEND
                    THE ASSOCIATED CALENDAR
                    STRUCTURE BACK TO THE
                    REQUESTOR
            ENDIF
    ENDIF
    IF THE REQUEST IS FOR A MEETING STATUS OR FOR
            MEETING INVITEE STATUS AND AN ASSOCIATED
            AUTO RESPONSE STRUCTURE HAS NOT BEEN
            PREPARED
        THEN PUT A NOTICE IN THE MAIL THAT A
                MANUAL RESPONSE IS REQUIRED
            ELSE IF THE REQUEST IS FOR A
                    MEETING STATUS OR FOR
                    MEETING INVITEE STATUS
                    AND AN ASSOCIATED AUTO
                    RESPONSE STRUCTURE HAS
                    BEEN PREPARED THEN
                    BUILD AND SEND THE
                    ASSOCIATED CALENDARS
```

```
                        -continued
                        STRUCTURE BACK TO THE
                        REQUESTOR AND PUT NOTE
                        IN MAIL THAT A
                        RESPONSE HAS BEEN SENT
                    ENDIF
            ENDIF
END AUTO RESPONSE PROC
```

Figure 8:
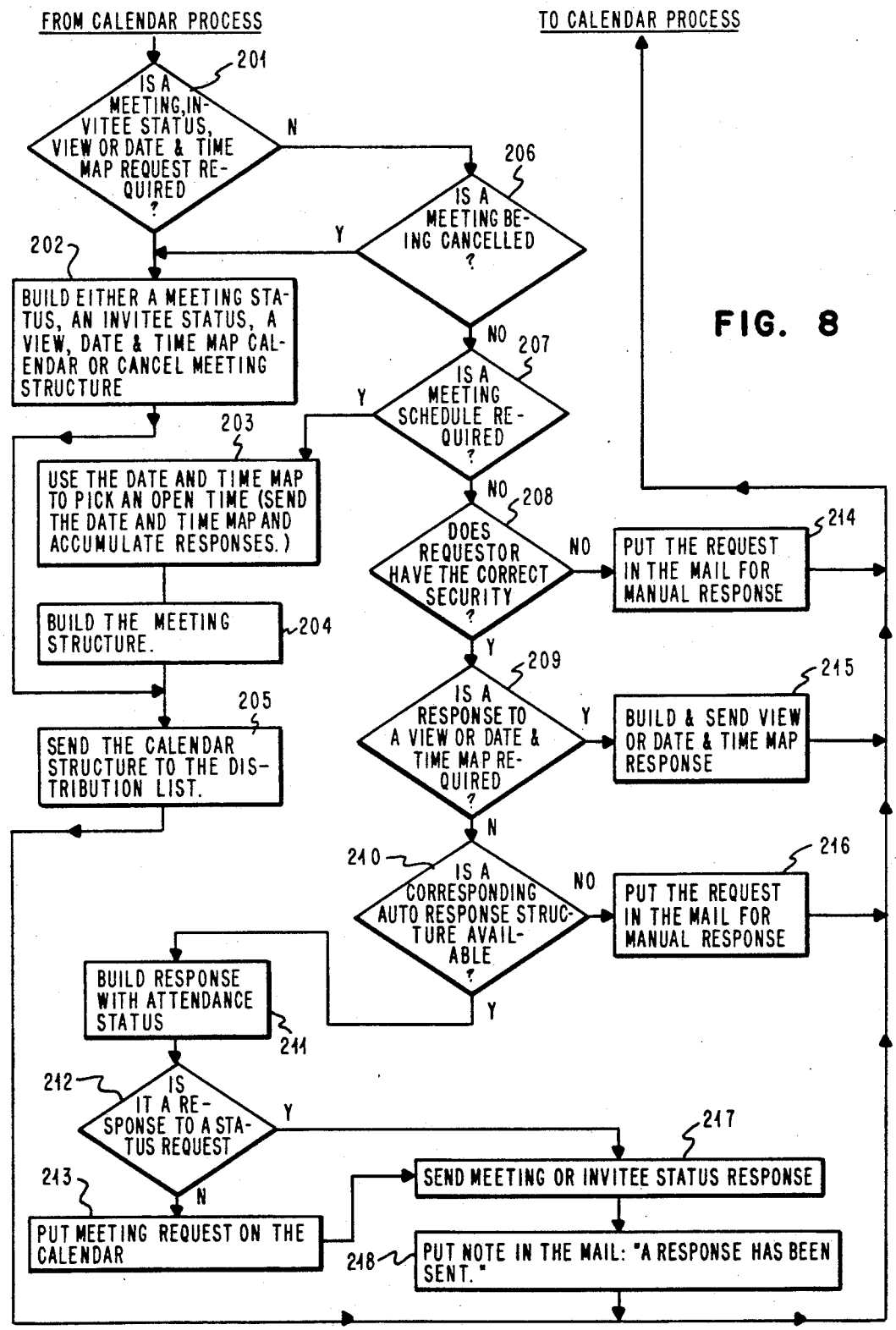

FIGS. 7 and 8 show flow diagrams for the autobuild data stream procedure and the auto response process. Referring first to FIG. 7, the calendar process represented by block 101 interacts with the auto response process in block 102 which then interacts with the names list in block 103, the auto response structure in block 104, the meeting information in block 105, the trigger structures in block 106 and the program process in block 107 to establish the automatic invocation process. The communication process in block 101 on system one interacts with the communication process in block 108 on system two to transmit and receive response thereto and therefrom, respectively. System two in block 109 determines whether the calendar event to be scheduled is a meeting schedule request. If the calendar event is not a meeting schedule request, the calendar event or function, control is transferred to block 110 where the function is executed. Thereafter, the control is transferred back to block 108.

If the calendar event is a meeting schedule request, control is transferred from block 109 to block 111 to retrieve the address of the calendars associated with the names indicated in the names list entry. The automatic response process then interacts with the names list until all of the calendar owners included in the names list are notified of the meeting. Thereafter, the automatic response process in block 112 then interacts with the names list in block 111, the automatic response structures and the calendar communication process in block 108 to build and transmit the appropriate responses to the requestor or operator on system one. When all of the responses have been built and transmitted to system one, control is transferred from block 114 to the calendar communication process in block 101 through the communication process in block 108.

Referring to FIG. 8, block 201 determines if the interaction between block 101 (FIG. 7) of the autobuild process and the auto response process resulted in the generation of a meeting status request, an invitee status request, a view request or a date and time map request, control is transferred from block 201 to block 202 to build the correct calendar structure for transmission to the distribution list in block 205. However, if in the determination in block 201 is not one of the requests set forth above, then block 206 determines if the interaction resulted in a meeting is to be canceled. Control is transferred from block 206 to blocks 202 and 205 to build and transmit a cancel meeting data structure to the calendar process in block 101 (FIG. 7).

If a meeting is not being canceled in block 206, control is transferred to block 207 to determine whether a meeting is to be scheduled. If the meeting is to be scheduled, the time and date map process is invoked in block 203 to locate open time on the invitees calendars. After the time has been determined for the meeting, the correct structure is built block 204 for transmission to the invitees in block 205. Control is then returned to the calendar process in block 101.

If the information requestor or operator does not have the proper security level in block 208, the request is placed in the mail for a manual response and control is returned to the calendar process through block 214. If the requestor has the proper security level and a response to a view or date and time map is required in block 209, the view or date and time map response is built and transmitted in block 215 and control is transferred from block 215 to the calendar process. Similarly, if an auto response structure does not exist for an automatic response in block 210, the request is placed in the mail for manual response in block 216 and control is transferred from block 216 to the calendar process.

If a corresponding auto response structure is available in block 210, a response is built which contains either the attendance status or the meeting status in block 211. Block 212 determines whether the response is an invitee status request and transfers control to block 217 to send the invitee status and a note is put in the mail in block 218 which indicates that a response was sent. Control is then transferred from block 218 to the calendar process.

If, however, the response in block 212 was not the response to an invitee status request, then response is built in response to a meeting request. Thereafter, the meeting request is scheduled on the calendar in block 213. A response is then sent with an attendance status in block 217 and a note is placed in the mail in block 218. Control is then transferred from block 218 to the calendar process.

While the invention has been shown and illustrated with reference to a preferred embodiment, it will be understood by those skilled in the art that various modifications may be made without departing from the spirit of the invention and scope of the appended claims.

We claim:

1. In a data processing system including a network of interactive workstations, a method of relating calendar information being maintained within said system, as represented by data of at least one calendar of a first individual user of said system comprising:

establishing in said data processing system by a second user, a first data structure which includes calendar information relating to a status of said at least one calendar, said information including the parameters of:

an identification of a calendar event;
a tentative or definite status for said calendar event;
a priority for said calendar event;
a time span for said calendar event; and
a list of names associated with a plurality of calendars being maintained on said system;

first comparing, by said data processing system, a security level of said second user with a security level of said an owner of said at least one calendar;

second comparing, by said data processing system and in response to said first comparing, said calendar information in said first data structure with said data of said at least one calendar;

automatically generating, by said data processing system and in response to said second comparing, of said at least one calendar as regards said calendar information in said first data structure;

transmitting said second data structure to said second user to confirm said status of said at least one calendar;

enabling an automatic scheduling of an event in said at least one calendar in response to said status by transmitting a trigger, which is a reminder of said calendar event, at a designated time selected by said second user to selected other users who maintain calendars on said data processing system.

2. The method as recited in claim 1 wherein said trigger is a message trigger and wherein said method further includes the step of generating a message to be transmitted to said calendars associated with said list of names at said designated time.

3. The method of claim 1 wherein said trigger audio tone.

4. The method of claim 1 wherein said trigger is a process and wherein said method further includes the step of identifying said process to be executed at said designated time.

5. The method of claim 1 further including the step of selecting more than one trigger.

6. The method as recited in claim 1, wherein said step of scheduling an event includes the step of automatically requesting the status of a specified meeting at a specified time.

7. The method as recited in claim 6 further includes the steps of:

identifying an attendee which is required to attend said specified meeting; and voiding operations undertaken in said scheduling an event step at a specified time in response to a status of said specified attendee indicating non-attendance at said specified meeting.

8. The method as recited in claim 1, wherein said step of scheduling an event includes the step of requesting the status of an identified attendee at a specified meeting at a specified time.

9. The method as recited in claim 1, wherein said step of scheduling an event includes the step of requesting the status of attendees previously scheduled to attend a specified meeting.

* * * * *

UNITED STATES PATENT AND TRADEMARK OFFICE
CERTIFICATE OF CORRECTION

PATENT NO. : 5,070,470
DATED : December 3, 1991
INVENTOR(S) : Keith J. Scully and Harinder S. Singh It is certified that error appears in the above—identified patent and that said Letters Patent is hereby corrected as shown below:

Col. 12, line 48, after "system", please insert --,--;
       line 60, please delete "comprising" and insert --comparing--;
       line 68, after "comparing," please insert --a second data structure
               which sets forth said status--; and
Col. 14, line 19, after "1", please delete ",".

Signed and Sealed this

Fifteenth Day of June, 1993

Attest:

MICHAEL K. KIRK

Attesting Officer     Acting Commissioner of Patents and Trademarks